(12) United States Patent
Jang et al.

(10) Patent No.: US 8,313,409 B2
(45) Date of Patent: *Nov. 20, 2012

(54) GEAR TRAIN OF AUTOMATIC TRANSMISSION FOR VEHICLES

(75) Inventors: Wookjin Jang, Yongin (KR); Jinhyung Kong, Gwacheon (KR)

(73) Assignee: Hyundai Motor Company, Seoul (KR)

( * ) Notice: Subject to any disclaimer, the term of this patent is extended or adjusted under 35 U.S.C. 154(b) by 423 days.

This patent is subject to a terminal disclaimer.

(21) Appl. No.: 12/615,023

(22) Filed: Nov. 9, 2009

(65) Prior Publication Data

US 2010/0331135 A1      Dec. 30, 2010

(30) Foreign Application Priority Data

Jun. 30, 2009   (KR) .................. 10-2009-0059086

(51) Int. Cl.
*F16H 3/44*      (2006.01)

(52) U.S. Cl. ........................................ 475/281; 475/325
(58) Field of Classification Search .......... 475/275–292, 475/296–297, 313, 319, 324, 325
See application file for complete search history.

(56) References Cited

U.S. PATENT DOCUMENTS

| 7,037,232 | B2 | 5/2006 | Ishimaru |
| 7,455,614 | B2* | 11/2008 | Seo et al. ............... 475/280 |
| 2010/0331136 | A1* | 12/2010 | Jang et al. ............... 475/275 |

* cited by examiner

*Primary Examiner* — Roger Pang
(74) *Attorney, Agent, or Firm* — Morgan, Lewis & Bockius LLP

(57) ABSTRACT

A gear train of an automatic transmission for vehicles has advantages of improving power delivery performance and reducing fuel consumption as a consequence of realizing eight forward speeds and one reverse speed by combining two simple planetary gear sets and one compound planetary gear set with two clutches and four brakes.

8 Claims, 3 Drawing Sheets

FIG.2

| | C1 | C2 | B1 | B2 | B3 | B4 | F1 | shift ratio |
|---|---|---|---|---|---|---|---|---|
| D1 | ● | | ● | | | | | 3.840 |
| D2 | ● | | ○ | | | | ● | 3.840 |
| D3 | ● | | | ● | | | | 2.092 |
| D4 | ● | | | | ● | | | 1.534 |
| D5 | ● | ● | | | | ● | | 1.264 |
| D6 | | ● | | | | ● | | 1.000 |
| D7 | | ● | | | ● | | | 0.800 |
| D8 | | ● | | ● | | | | 0.706 |
| | | | | | | | | 0.615 |
| REV | | | ● | | | ● | | -2.667 |

GEAR TRAIN OF AUTOMATIC TRANSMISSION FOR VEHICLES

CROSS-REFERENCE TO RELATED APPLICATION

The present application claims priority to Korean Patent Application No. 10-2009-0059086 filed on Jun. 30, 2009, the entire contents of which are incorporated herein for all purposes by this reference.

BACKGROUND OF THE INVENTION

1. Field of the Invention

The present invention relates to a gear train of an automatic transmission for vehicles which realizes eight forward speeds by combining two simple planetary gear sets and one compound planetary gear set with two clutches and four brakes.

2. Description of the Related Art

A typical shift mechanism of an automatic transmission utilizes a combination of a plurality of planetary gear sets. A gear train of such an automatic transmission that includes the plurality of planetary gear sets changes rotational speed and torque received from a torque converter of the automatic transmission, and accordingly transmits the changed torque to an output shaft.

It is well known that when a transmission realizes a greater number of shift speeds, speed ratios of the transmission can be more optimally designed, and therefore a vehicle can have economical fuel mileage and better performance. For that reason, an automatic transmission that is able to realize more shift speeds is under continuous investigation.

In addition, with the same number of speeds, features of a gear train, such as durability, efficiency in power transmission, and size, substantially depend on the layout of the combined planetary gear sets. Therefore, designs for a combining structure of a gear train are also under continuous investigation.

A manual transmission that has too many speeds causes inconvenience to a driver. Therefore, the advantageous features of having more shift-speeds are more important in an automatic transmission because an automatic transmission automatically controls the shifting operations.

Currently, four-speed and five-speed automatic transmissions are most often found on the market. However, six-speed automatic transmissions have also been realized for enhancement of performance of power transmission and for enhanced fuel mileage of a vehicle. In addition, seven-speed automatic transmissions and eight-speed automatic transmissions have been developed at a good pace.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a gear train of an automatic transmission for vehicles having advantages of improving power delivery performance and reducing fuel consumption as a consequence of realizing eight forward speeds and one reverse speed by combining two simple planetary gear sets and one compound planetary gear set with two clutches and four brakes.

A gear train of an automatic transmission for vehicles according to an exemplary embodiment of the present invention may include first and second planetary gear sets being respectively a simple planetary gear set having three rotational elements and a third planetary gear set being a compound planetary gear set having four rotational elements, wherein the first planetary gear set includes a first rotational element directly connected to an input shaft and always operated as an input element, a second rotational element selectively connected to one rotational element of the second planetary gear set, and a third rotational element directly connected to another rotational element of the second planetary gear set, wherein the second planetary gear set includes a fourth rotational element directly connected to the third rotational element, a fifth rotational element selectively connected to the second rotational element, a transmission housing, and the input shaft, and a sixth rotational element directly connected to an output gear so as to be always operated as an output element, and wherein the third planetary gear set includes a seventh rotational element directly connected to the input shaft, an eighth rotational element directly connected to the fourth rotational element and selectively connected to the transmission housing, and ninth and tenth rotational elements selectively connected to the transmission housing respectively.

The first, second, and third planetary gear sets may be sequentially disposed from an engine.

The first planetary gear set may be a single pinion planetary gear set, wherein the first rotational element is a first sun gear, the second rotational element is a first planet carrier, and the third rotational element is a first ring gear. The second planetary gear set may be a single pinion planetary gear set, wherein the fourth rotational element is a second sun gear, the fifth rotational element is a second planet carrier, and the sixth rotational element is a second ring gear. The third planetary gear set may be a Ravigneaux planetary gear set which is formed by a single pinion planetary gear set and a double pinion planetary gear set and sharing a ring gear and a planet carrier, wherein the seventh rotational element is a fourth sun gear engaged with a short pinion, the eighth rotational element is a third ring gear, the ninth rotational element is a third planet carrier, and the tenth rotational element is a third sun gear engaged with a long pinion.

The first, second, and third planetary gear sets are combined by two clutches and four brakes, wherein the input shaft is directly connected to the first rotational element and the seventh rotational element, the third, fourth, and eighth rotational elements are directly connected to each other, and the sixth rotational element is directly connected to the output gear, and wherein the second rotational element is selectively connected to the fifth rotational element via a first clutch, the fifth rotational element is selectively connected to the input shaft via a second clutch and is selectively connected to the transmission housing via a first brake, the eighth rotational element is selectively connected to the transmission housing via a second brake, the ninth rotational element is selectively connected to the transmission housing via a third brake, and the tenth rotational element is selectively connected to the transmission housing via a fourth brake.

The gear train may further include a one-way clutch disposed in parallel with the first brake.

According to the gear train, the first clutch and the first brake may be operated at a first forward speed, the first clutch and the second brake may be operated at a second forward speed, the first clutch and the third brake may be operated at a third forward speed, the first clutch and the fourth brake may be operated at a fourth forward speed, the first and second clutches may be operated at a fifth forward speed, the second clutch and the fourth brake may be operated at a sixth forward speed, the second clutch and the third brake may be operated at a seventh forward speed, the second clutch and the second brake may be operated at an eighth forward speed, and the first and fourth brakes may be operated at a reverse speed.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is an operation chart of friction elements at each shift speed for a gear train of an automatic transmission for vehicles according to an exemplary embodiment of the present invention.

Figure 1:
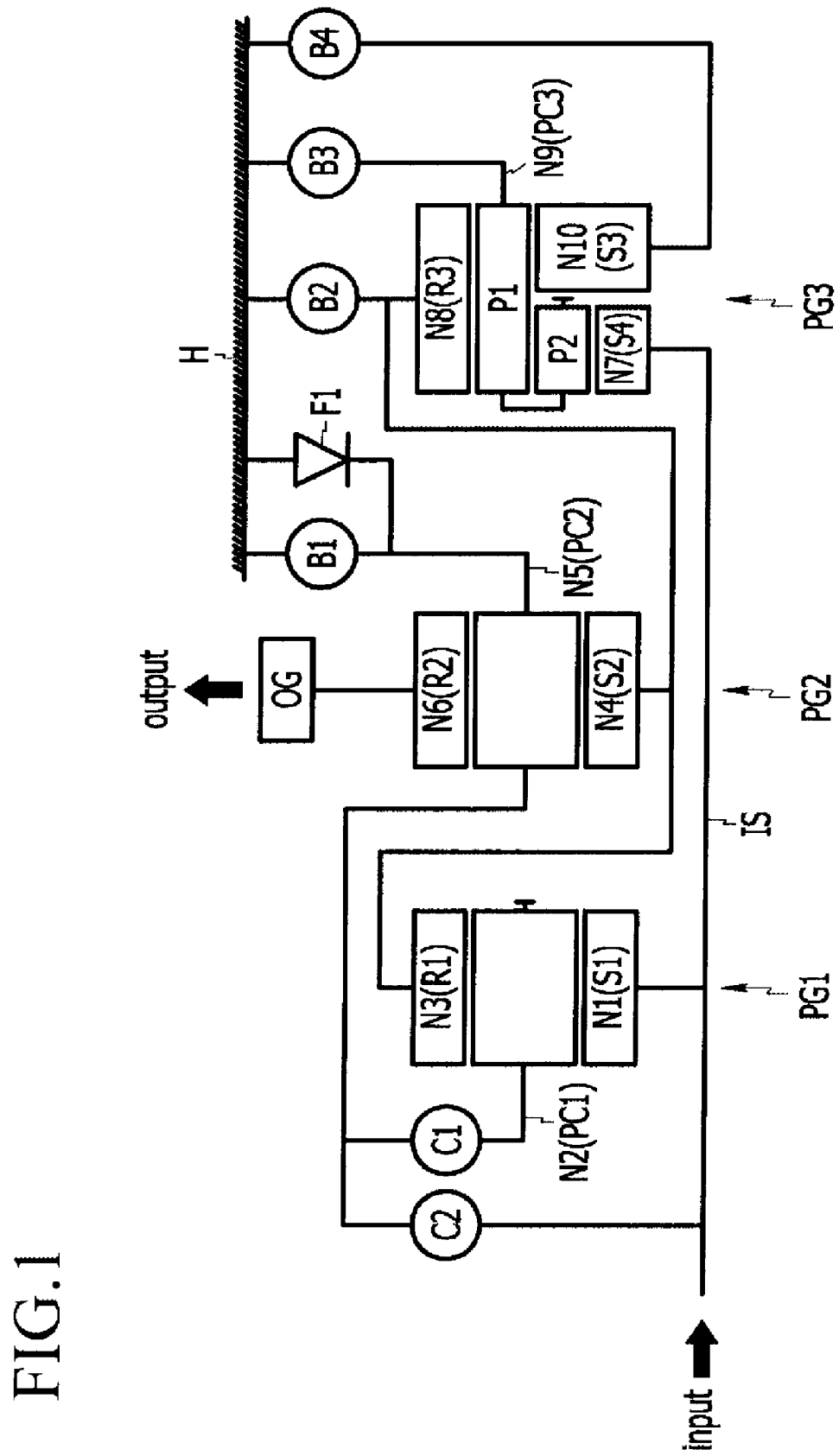
FIG. 1 is a schematic diagram of a gear train of an automatic transmission for vehicles according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

FIG. 1 is a schematic diagram of a gear train of an automatic transmission for vehicles according to an exemplary embodiment of the present invention. A gear train according to an exemplary embodiment of the present invention includes first, second, and third planetary gear sets PG1, PG2, and PG3 disposed on the same axis, two clutches C1 and C2, and four brakes B1, B2, B3, and B4.

A rotational speed input from an input shaft IS is changed by the first, second, and third planetary gear sets PG1, PG2, and PG3 and is output through an output gear OG connected to an output element of the second planetary gear set PG2. The first, second, and third planetary gear sets PG1, PG2, and PG3 are sequentially disposed from an engine.

The input shaft IS is an input member and denotes a turbine shaft of a torque converter. Torque transmitted from a crankshaft of the engine is converted by the torque converter and is input to the gear train through the input shaft IS. The output gear OG is an output member and is connected to a well-known differential apparatus (not shown) so as to transmit an output of the gear train to driving wheels through the differential apparatus.

The first planetary gear set PG1 is a single pinion planetary gear set, and has three rotational elements consisting of a sun gear, a planet carrier, and a ring gear. For better comprehension and ease of description, the sun gear is indicated by a first sun gear S1, the planet carrier is indicated by a first planet carrier PC1, and the ring gear is indicated by a first ring gear R1.

The first sun gear S1 is a first rotational element N1 and is always operated as an input element. The first planet carrier PC1 is a second rotational element N2 and is selectively connected to one rotational element of the second planetary gear set PG2 so as to be operated as a selective output element. The first ring gear R1 is a third rotational element N3 and is directly connected to another rotational element of the second planetary gear set PG2.

For this purpose, the first sun gear S1 of the first rotational element N1 is directly connected to the input shaft IS, the first planet carrier PC1 of the second rotational element N2 is selectively connected to one rotational element of the second planetary gear set PG2 via a first clutch C1, and the first ring gear R1 of the third rotational element N3 is directly connected to another rotational element of the second planetary gear set PG2.

The second planetary gear set PG2 is a single pinion planetary gear set, and has three rotational elements consisting of a sun gear, a planet carrier, and a ring gear. For better comprehension and ease of description, the sun gear is indicated by a second sun gear S2, the planet carrier is indicated by a second planet carrier PC2, and the ring gear is indicated by a second ring gear R2.

The second sun gear S2 is a fourth rotational element N4 and is operated selectively as an input element or a fixed element. The second planet carrier PC2 is a fifth rotational element N5 and is operated as a selective fixed element and a selective input element. The second ring gear R2 is a sixth rotational element N6 and is operated always as a final output element.

For this purpose, the second sun gear S2 of the fourth rotational element N4 is directly connected to the third rotational element N3 of the first planetary gear set PG1 and is directly connected to one rotational element of the third planetary gear set PG3 which is operated as a selective fixed element. The second planet carrier PC2 of the fifth rotational element N5 is selectively connected to the first planet carrier PC1 of the first planetary gear set PG1 which is the second rotational element N2 via the first clutch C1, and is selectively connected to the input shaft IS via a second clutch C2. In addition, the second planet carrier PC2 of the fifth rotational element N5 is selectively connected to a transmission housing H via a first brake B1 disposed in parallel with a one-way clutch F1. The second ring gear R2 of the sixth rotational element N6 is directly connected to the output gear OG so as to be always operated as the output element.

Here, the first brake B1 is disposed in parallel with the one-way clutch F1, but the one-way clutch F1 may be omitted.

The third planetary gear set PG3 is a Ravigneaux planetary gear set formed by combining a single pinion planetary gear set and a double pinion planetary gear set and sharing a ring gear and a planet carrier.

Accordingly, the third planetary gear set PG3 includes a ring gear, a planet carrier, and two sun gears. For better comprehension and ease of description, the ring gear is indicated by a third ring gear R3, the planet carrier is indicated by a third planet carrier PC3, the sun gear engaged with a long pinion P1 is indicated by a third sun gear S3, and the sun gear engaged with a short pinion P2 is indicated by a fourth sun gear S4.

The fourth sun gear S4 is a seventh rotational element N7 and is always operated as an input element. The third ring gear R3 is an eighth rotational element N8, is directly connected to the fourth rotational element N4 of the second planetary gear set PG2, and is operated as a selective fixed element. The third planet carrier PC3 is a ninth rotational element N9 and is operated as a selective fixed element. The third sun gear S3 is a tenth rotational element N10 and is operated as a selective fixed element.

For this purpose, the fourth sun gear S4 of the seventh rotational element N7 is directly connected to the input shaft IS, the third ring gear R3 of the eighth rotational element N8 is selectively connected to the transmission housing H via a second brake B2 and is directly connected to the fourth rotational element N4 of the second planetary gear set PG2, the third planet carrier PC3 of the ninth rotational element N9 is selectively connected to the transmission housing H via a third brake B3, and the third sun gear S3 of the tenth rotational element N10 is selectively connected to the transmission housing H via a fourth brake B4.

The torque of the engine transmitted from the input shaft IS is input respective through rotational elements N1 and N7 of the first and third planetary gear sets PG1 and PG3, is converted into eight forward speeds and one reverse speed by operations of the first, second, and third planetary gear sets PG1, PG2, and PG3, and is output through the output gear OG that is the final output pathway.

Friction elements consisting of the first and second clutches C1 and C2 and the first, second, third, and fourth brakes B1, B2, B3, and B4 are conventional multi-plate friction elements of wet type that are operated by hydraulic pressure.

In addition, the first and second clutches C1 and C2 are disposed at a front portion of the first planetary gear set PG1, the one-way clutch F1 and the first brake B1 are disposed between the second and third planetary gear sets PG2 and PG3, and the second, third, and fourth brakes B2, B3, and B4 are disposed at a rear portion of an external circumference of the third planetary gear set PG3.

If the friction elements are dispersed as described above, formation of hydraulic lines for supplying hydraulic pressure to such friction elements may be simplified, and weight balance in the automatic transmission may be enhanced.

FIG. 2 is an operation chart of friction elements (e.g., clutches and brakes) at each shift speed for a gear train according to an exemplary embodiment of the present invention. Referring to FIG. 2, two friction elements are operated at each shift speed in the gear train according to an exemplary embodiment of the present invention.

That is, the first clutch C1 and the first brake B1 are operated at a first forward speed D1; the first clutch C1 and the second brake B2 are operated at a second forward speed D2; the first clutch C1 and the third brake B3 are operated at a third forward speed D3; the first clutch C1 and the fourth brake B4 are operated at a fourth forward speed D4; the first and second clutches C1 and C2 are operated at a fifth forward speed D5; the second clutch C2 and the fourth brake B4 are operated at a sixth forward speed D6; the second clutch C2 and the third brake B3 are operated at a seventh forward speed D7; the second clutch C2 and the second brake B2 are operated at an eighth forward speed D8; and the first brake B1 and the fourth brake B4 are operated at a reverse speed REV.

Here, it is exemplarily described that the first brake B1 is operated at the first forward speed D1. However, if the one-way clutch F1 is used such as the case of the present exemplary embodiment, the one-way clutch F1 instead of the first brake B1 can be operated at the first forward speed D1.

Figure 3:
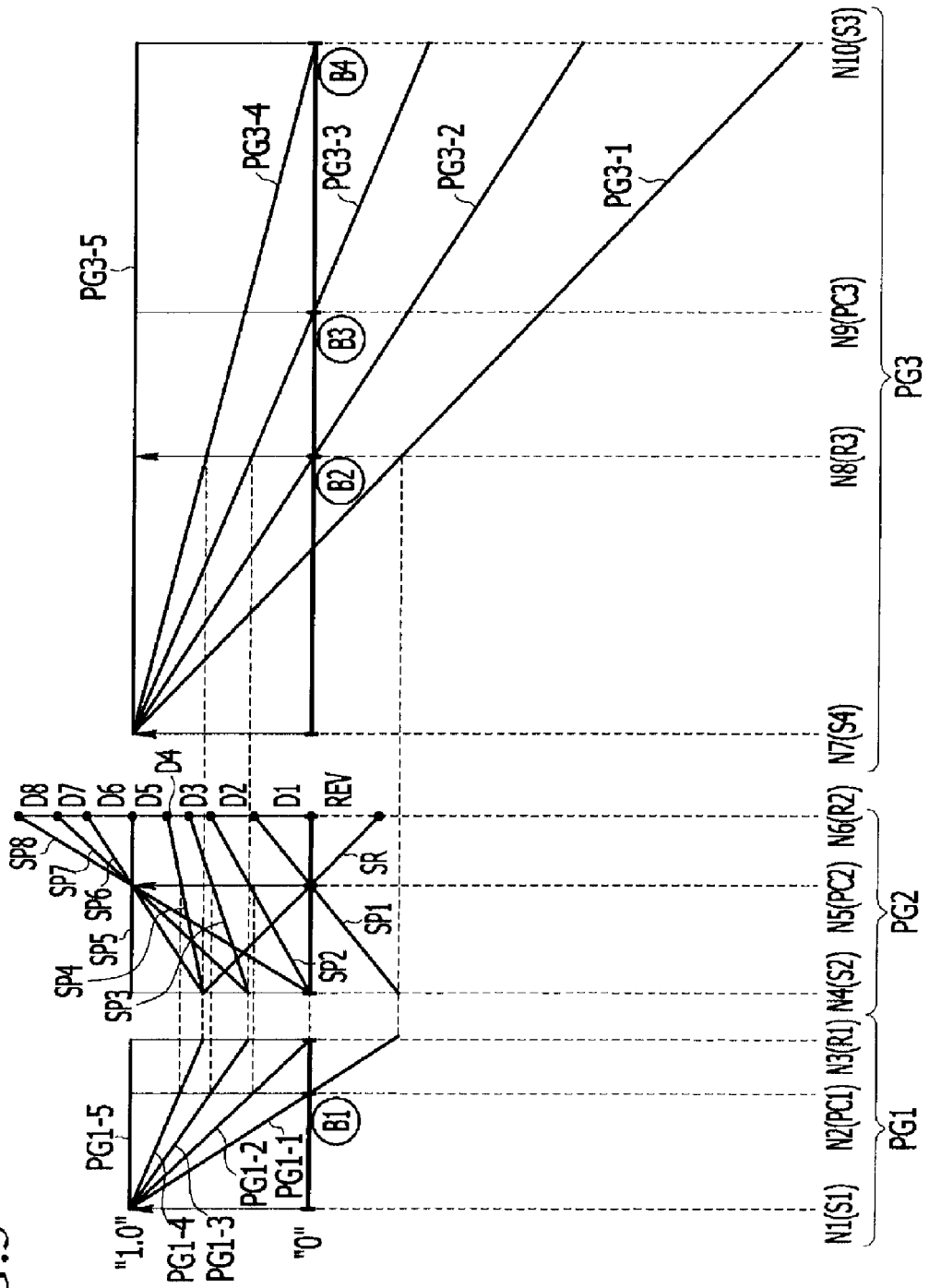
FIG. 3 is a lever diagram for a gear train according to an exemplary embodiment of the present invention.

FIG. 3 is a lever diagram for a gear train according to an exemplary embodiment of the present invention. In the drawings, a lower horizontal line represents a rotational speed is "0", and an upper horizontal line represents a rotational speed is "1.0", that is, the rotational speed thereof is the same as that of the input shaft IS.

Three vertical lines of the first planetary gear set PG1 in the drawings sequentially represent the first sun gear S1 of the first rotational element N1, the first planet carrier PC1 of the second rotational element N2, and the first ring gear R1 of the third rotational element N3, and distances therebetween are set according to a gear ratio of the first planetary gear set PG1 (teeth number of the sun gear/teeth number of the ring gear).

Three vertical lines of the second planetary gear set PG2 in the drawings sequentially represent the second sun gear S2 of the fourth rotational element N4, the second planet carrier PC2 of the fifth rotational element N5, and the second ring gear R2 of the sixth rotational element N6, and distances therebetween are set according to a gear ratio of the second planetary gear set PG2 (teeth number of the sun gear/teeth number of the ring gear).

Four vertical lines of the third planetary gear set PG3 in the drawings sequentially represent the fourth sun gear S4 of the seventh rotational element N7, the third ring gear R3 of the eighth rotational element N8, the third planet carrier PC3 of the ninth rotational element N9, and the third sun gear S3 of the tenth rotational element N10, and distances therebetween are set according to a gear ratio of the third planetary gear set PG3 (teeth number of the sun gear/teeth number of the ring gear).

Position of each rotation element in the lever diagram is well known to a person of an ordinary skill in the art who designs a gear train, and thus detailed description will be omitted.

[First Forward Speed]

At the first forward speed D1, the first clutch C1 and the first brake B1 are operated, as shown in FIG. 2.

In a state that torque of the input shaft IS is simultaneously input to the first rotational element N1 and the seventh rotational element N7, the first clutch C1 and the first brake B1 are operated.

Therefore, in a state that the torque of the input shaft IS is input to the first rotational element N1, the second rotational element N2 is operated as the fixed element such that the rotational elements of the first planetary gear set PG1 form a first speed line PG1-1 and a reverse rotational speed is output through the third rotational element N3.

In addition, in a state that the reverse rotational speed is input to the fourth rotational element N4 directly connected to the third rotational element N3, the fifth rotational element N5 is operated as the fixed element by an operation of the first brake B1. Therefore, the rotational elements of the second planetary gear set PG2 form a first shift line SP1 and the first forward speed D1 is output through the sixth rotational element N6 that is the output element. A shift ratio of the first forward speed D1 (rotational speed of the input shaft IS/rotational speed of the output gear OG) is maximum and is "3.840".

At this time, in a state that the torque of the input shaft IS is input to the seventh rotational element N7, the reverse rotational speed is input to the eighth rotational element N8 directly connected to the fourth rotational element N4 such that the rotational elements of the third planetary gear set PG3 form a first speed line PG3-1.

It is exemplarily described that the first brake B1 is operated at the first forward speed D1. However, if the one-way clutch F1 is used such as the case of the exemplary embodiment of the present invention, the fifth rotational element N5 is operated as the fixed element by an operation of the one-way clutch F1 instead of the operation of the first brake B1.

[Second Forward Speed]

At the second forward speed D2, the first brake B1 which is operated at the first forward speed D1 is released and the second brake B2 is operated.

In a state that the torque of the input shaft IS is simultaneously input to the first rotational element N1 and the seventh rotational element N7, the second and fifth rotational elements N2 and N5 are connected to each other by an operation of the first clutch C1.

Since the third rotational element N3 is operated as the fixed element by an operation of the second brake B2 in a state that the torque of the input shaft IS is input to the first rotational element N1, the rotational elements of the first planetary gear set PG1 form a second speed line PG1-2 and a reduced rotational speed is output through the second rotational element N2.

Then, in a state that the torque of the second rotational element N2 is input to the fifth rotational element N5 of the second planetary gear set PG2 through the first clutch C1, the fourth rotational element N4 is operated as the fixed element by the operation of the second brake B2. Therefore, the rotational elements of the second planetary gear set PG2 form a second shift line SP2 and the second forward speed D2 is output through the sixth rotational element N6 that is the output element. A shift ratio of the second forward speed D2 (rotational speed of the input shaft IS/rotational speed of the output gear OG) is "2.092".

At this time, in a state that the torque of the input shaft IS is input to the seventh rotational element N7, the eighth rotational element N8 is operated as the fixed element by the operation of the second brake B2 such that the rotational elements of the third planetary gear set PG3 form a second speed line PG3-2.

[Third Forward Speed]

At the third forward speed D3, the second brake B2 that is operated at the second forward speed D2 is released and the third brake B3 is operated.

In a state that the torque of the input shaft IS is simultaneously input to the first rotational element N1 and the seventh rotational element N7, the second and fifth rotational elements N2 and N5 are connected to each other by the operation of the first clutch C1.

In a state that the torque of the input shaft IS is input to the seventh rotational element N7, the ninth rotational element N9 is operated as the fixed element by an operation of the third brake B3 such that the rotational elements of the third planetary gear set PG3 form a third speed line PG3-3.

In addition, in a state that the torque of the input shaft IS is input to the first rotational element N1, torque of the eighth rotational element N8 is input to the third rotational element N3. Therefore, the rotational elements of the first planetary gear set PG1 form a third speed line PG1-3.

The torque of the eighth rotational element N8 is input to the fourth rotational element N4 of the second planetary gear set PG2, and the torque of the second rotational element N2 is input to the fifth rotational element N5. Therefore, the rotational elements of the second planetary gear set PG2 form a third shift line SP3 and the third forward speed D3 is output through the sixth rotational element N6 that is the output element. A shift ratio of the third forward speed D3 (rotational speed of the input shaft IS/rotational speed of the output gear OG) is "1.534".

[Fourth Forward Speed]

At the fourth forward speed D4, the third brake B3 that is operated at the third forward speed D3 is released and the fourth brake B4 is operated.

In a state that the torque of the input shaft IS is simultaneously input to the first rotational element N1 and the seventh rotational element N7, the second and fifth rotational elements N2 and N5 are connected to each other by the operation of the first clutch C1.

At this time, in a state that the torque of the input shaft IS is input to the seventh rotational element N7, the tenth rotational element N10 is operated as the fixed element as an operation of the fourth brake B4 such that the rotational elements of the third planetary gear set PG3 form a fourth speed line PG3-4.

In addition, in a state that the torque of the input shaft IS is input to the first rotational element N1, the torque of the eighth rotational element N8 is input to the third rotational element N3 such that the rotational elements of the first planetary gear set PG1 form a fourth speed line PG1-4.

The torque of the eighth rotational element N8 is input to the fourth rotational element N4 of the second planetary gear set PG2, and the torque of the second rotational element N2 is input to the fifth rotational element N5. Therefore, the rotational elements of the second planetary gear set PG2 form a fourth shift line SP4 and the fourth forward speed D4 is output through the sixth rotational element N6 that is the output element. A shift ratio of the fourth forward speed D4 (rotational speed of the input shaft IS/rotational speed of the output gear OG) is "1.264".

[Fifth Forward Speed]

At the fifth forward speed D5, the fourth brake B4 that is operated at the fourth forward speed D4 is released and the second clutch C2 is operated.

In a state that the torque of the input shaft IS is simultaneously input to the first rotational element N1 and the seventh rotational element N7, the second and fifth rotational elements N2 and N5 are connected to each other by the operation of the first clutch C1.

At this time, the rotational elements of the first planetary gear set PG1 become a direct-coupling state by the operation of the second clutch C2 and form a fifth speed line PG1-5. Therefore, all rotational elements of the first planetary gear set PG1 rotate with the same rotational speed as the input shaft IS.

Since the fourth and fifth rotational elements N4 and N5 are connected to the third rotational element N3 and the input shaft IS respectively in the second planetary gear set PG2, the rotational elements of the second planetary gear set PG2 become a direct-coupling state and form a fifth shift line SP5. Therefore, the same rotational speed as the input shaft IS is output through the sixth rotational element N6 that is the output element. Therefore, a shift ratio of the fifth forward speed D5 is "1.000".

At this time, in a state that the torque of the input shaft IS is input to the seventh rotational element N7, the torque of the fourth rotational element N4 is input to the eighth rotational element N8. Therefore, the rotational elements of the third planetary gear set PG3 become a direct-coupling state and form a fifth speed line PG3-5.

[Sixth Forward Speed]

At the sixth forward speed D6, the first clutch C1 that is operated at the fifth forward speed D5 is released and the fourth brake B4 is operated.

In a state that the torque of the input shaft IS is simultaneously input to the first rotational element N1 and the seventh rotational element N7, the torque of the input shaft IS is also input to the fifth rotational element N5 by the operation of the second clutch C2.

In a state that the torque of the input shaft IS is input to the seventh rotational element N7, the tenth rotational element N10 is operated as the fixed element by the operation of the fourth brake B4. Therefore, the rotational elements of the third planetary gear set PG3 form the fourth speed line PG3-4.

In addition, in a state that the torque of the eighth rotational element N8 is transmitted to the fourth rotational element N4 of the second planetary gear set PG2, the torque of the input shaft IS is input to the fifth rotational element N5 by the operation of the second clutch C2. Therefore, the rotational elements of the second planetary gear set PG2 form a sixth shift line SP6 and the sixth forward speed D6 is output through the sixth rotational element N6 that is the output element. A shift ratio of the sixth forward speed D6 (rotational speed of the input shaft IS/rotational speed of the output gear OG) is "0.800".

[Seventh Forward Speed]

At the seventh forward speed D7, the fourth brake B4 that is operated at the sixth forward speed D6 is released and the third brake B3 is operated.

In a state that the torque of the input shaft IS is input to the first rotational element N1 and the seventh rotational element N7, the torque of the input shaft IS is also input to the fifth rotational element N5 by the operation of the second clutch C2.

In a state that the torque of the input shaft IS is input to the seventh rotational element N7, the ninth rotational element N9 is operated as the fixed element by the operation of the third brake B3. Therefore, the rotational elements of the third planetary gear set PG3 form the third speed line PG3-3.

In addition, in a state that the torque of the eighth rotational element N8 is transmitted to the fourth rotational element N4 of the second planetary gear set PG2, the torque of the input shaft IS is input to the fifth rotational element N5 by the operation of the second clutch C2. Therefore, the rotational elements of the second planetary gear set PG2 form a seventh shift line SP7 and the seventh forward speed D7 is output through the sixth rotational element N6 that is the output element. A shift ratio of the seventh forward speed D7 (rotational speed of the input shaft IS/rotational speed of the output gear OG) is "0.706".

[Eighth Forward Speed]

At the eighth forward speed D8, the third brake B3 that is operated at the seventh forward speed D7 is released and the second brake B2 is operated.

In a state that the torque of the input shaft IS is input to the first rotational element N1 and the seventh rotational element N7, the torque of the input shaft IS is also input to the fifth rotational element N5 by the operation of the second clutch C2.

In a state that the torque of the input shaft IS is input to the seventh rotational element N7, the eighth rotational element N8 is operated as the fixed element by the operation of the second brake B2. Therefore, the rotational elements of the third planetary gear set PG3 form the second speed line PG3-2.

In addition, since the fourth rotational element N4 of the second planetary gear set PG2 connected to the eighth rotational element N8 is operated as the fixed element, the rotational elements of the second planetary gear set PG2 form an eighth shift line SP8 and the eighth forward speed D8 is output through the sixth rotational element N6 that is the output element. A shift ratio of the eighth forward speed D8 (rotational speed of the input shaft IS/rotational speed of the output gear OG) is "0.615".

[Reverse Speed]

At the reverse shift speed REV, the first brake B1 and the fourth brake B4 are operated, as shown in FIG. 2.

In a state that the torque of the input shaft IS is input to the first rotational element N1 and the seventh rotational element N7, the tenth rotational element N10 is operated as the fixed element by the operation of the fourth brake B4 in the third planetary gear set PG3. Therefore, the rotational elements of the third planetary gear set PG3 form the fourth speed line PG3-4 and the torque of the eighth rotational element N8 is transmitted to the fourth rotational element N4 of the second planetary gear set PG2.

In a state that the torque of the eighth rotational element N8 is input to the fourth rotational element N4, the fifth rotational element N5 is operated as the fixed element by the operation of the first brake B1. Therefore, the rotational elements of the second planetary gear set PG2 form a reverse speed line SR and the reverse shift speed REV is output through the sixth rotational element N6 that is the output element. A shift ratio of the reverse shift speed REV (rotational speed of the input shaft IS/rotational speed of the output gear OG) is "−2.667".

The shift ratio at each shift speed will be gained when teeth numbers of the first sun gear S1, the first ring gear R1, the second sun gear S2, the second ring gear R2, the third sun gear S3, the fourth sun gear S4, the third ring gear R3 are 10, 24, 10, 16, 10, 15, and 30, respectively.

As described above, eight forward speeds and one reverse speed are achieved by combining the first and second planetary gear sets PG1 and PG2 that are simple planetary gear sets and the third planetary gear set PG3 that is a compound planetary gear set with two clutches C1 and C2 and four brakes B1, B2, B3, and B4 that are friction elements. Therefore, power delivery performance may be improved and fuel consumption may be reduced according to an exemplary embodiment of the present invention.

Since volume of a brake is smaller than that of a clutch and brakes are used more than clutches, an inside space of a transmission may be effectively utilized.

In addition, since two friction elements are operated at each shift speed, capacity of a hydraulic pump may be downsized and control efficiency of hydraulic pressure may be enhanced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of an automatic transmission for vehicles comprising first and second planetary gear sets being respectively a simple planetary gear set having three rotational elements and a third planetary gear set being a compound planetary gear set having four rotational elements, wherein the first planetary gear set comprises a first rotational element directly connected to an input shaft and always operated as an input element, a second rotational element selectively connected to one rotational element of the second planetary gear set, and a third rotational element directly connected to another rotational element of the second planetary gear set, wherein the second planetary gear set comprises a fourth rotational element directly connected to the third rotational element, a fifth rotational element selectively connected to the second rotational element, a transmission housing, and the input shaft, and a sixth rotational element directly connected to an output gear so as to be always operated as an output element, and wherein the third planetary gear set comprises a seventh rotational element directly connected to the input shaft, an eighth rotational element directly connected to the fourth rotational element and selectively connected to the transmission housing, and ninth and tenth rotational elements selectively connected to the transmission housing respectively.

2. The gear train of claim 1, wherein the first, second, and third planetary gear sets are sequentially disposed from an engine.

3. The gear train of claim 1, wherein the first planetary gear set is a single pinion planetary gear set, wherein the first rotational element is a first sun gear, the second rotational element is a first planet carrier, and the third rotational element is a first ring gear, wherein the second planetary gear set is a single pinion planetary gear set, wherein the fourth rotational element is a second sun gear, the fifth rotational element is a second planet carrier, and the sixth rotational element is a second ring gear, and wherein the third planetary gear set is a Ravigneaux planetary gear set which is formed by a single pinion planetary gear set and a double pinion planetary gear set and sharing a ring gear and a planet carrier, wherein the seventh rotational element is a fourth sun gear engaged with a short pinion, the eighth rotational element is a third ring gear, the ninth rotational element is a third planet carrier, and the tenth rotational element is a third sun gear engaged with a long pinion.

4. The gear train of claim 1, wherein the first, second, and third planetary gear sets are connected with two clutches and four brakes, wherein the input shaft is directly connected to the first rotational element and the seventh rotational element, wherein the third, fourth, and eighth rotational elements are directly connected to each other, and wherein the sixth rotational element is directly connected to the output gear, and wherein the second rotational element is selectively connected to the fifth rotational element via a first clutch, the fifth rotational element is selectively connected to the input shaft via a second clutch and is selectively connected to the transmission housing via a first brake, the eighth rotational element is selectively connected to the transmission housing via a second brake, the ninth rotational element is selectively connected to the transmission housing via a third brake, and the tenth rotational element is selectively connected to the transmission housing via a fourth brake.

5. The gear train of claim 4, further comprising a one-way clutch disposed in parallel with the first brake.

6. The gear train of claim 4, wherein the first clutch and the first brake are operated at a first forward speed, the first clutch and the second brake are operated at a second forward speed, the first clutch and the third brake are operated at a third forward speed, the first clutch and the fourth brake are operated at a fourth forward speed, the first and second clutches are operated at a fifth forward speed, the second clutch and the fourth brake are operated at a sixth forward speed, the second clutch and the third brake are operated at a seventh forward speed, the second clutch and the second brake are operated at an eighth forward speed, and the first and fourth brakes are operated at a reverse speed.

7. A gear train of an automatic transmission for vehicles comprising:

a first planetary gear set being a single pinion planetary gear set having a first sun gear, a first planet carrier, and a first ring gear;

a second planetary gear set being a single pinion planetary gear set having a second sun gear, a second planet carrier, and a second ring gear;

a third planetary gear set being a Ravigneaux planetary gear set which is formed by combining a single pinion planetary gear set and a double pinion planetary gear set and sharing a ring gear and a planet carrier, the third planetary gear set having a third sun gear engaged with a long pinion, a third planet carrier, a third ring gear, and a fourth sun gear engaged with a short pinion, wherein the first, second, and third planetary gear sets are connected with two clutches and four brakes, wherein an input shaft is directly connected to the first sun gear and the fourth sun gear, wherein the first ring gear, the second sun gear, and the third ring gear are directly connected to each other, and wherein the second ring gear is directly connected to an output gear, and wherein the first planet carrier is selectively connected to the second planet carrier via a first clutch, the second planet carrier is selectively connected to the input shaft via a second clutch and is selectively connected to a transmission housing via a first brake, the third ring gear is selectively connected to the transmission housing via a second brake, the third planet carrier is selectively connected to the transmission housing via a third brake, and the third sun gear is selectively connected to the transmission housing via a fourth brake.

8. The gear train of claim 7, further comprising a one-way clutch disposed in parallel with the first brake.

* * * * *